United States Patent
Hong et al.

(10) Patent No.: US 9,325,023 B2
(45) Date of Patent: Apr. 26, 2016

(54) METHOD FOR MANUFACTURING MEMBRANE-ELECTRODE ASSEMBLY FOR POLYMER ELECTROLYTE FUEL CELL AND MEMBRANE-ELECTRODE ASSEMBLY MANUFACTURED THEREBY

(75) Inventors: Young Taik Hong, Daejeon (KR); Tae Ho Kim, Daejeon (KR); Young Jun Yoon, Seoul (KR); Kyung Seok Yoon, Daejeon (KR); Duk Man Yu, Ansan-si (KR)

(73) Assignee: Korea Research Institute of Chemical Technology, Daejeon (KR)

( * ) Notice: Subject to any disclaimer, the term of this patent is extended or adjusted under 35 U.S.C. 154(b) by 174 days.

(21) Appl. No.: 14/115,952

(22) PCT Filed: Mar. 29, 2012

(86) PCT No.: PCT/KR2012/002305
§ 371 (c)(1),
(2), (4) Date: Mar. 12, 2014

(87) PCT Pub. No.: WO2012/153915
PCT Pub. Date: Nov. 15, 2012

(65) Prior Publication Data
US 2014/0377685 A1    Dec. 25, 2014

(30) Foreign Application Priority Data

May 11, 2011 (KR) .......... 10-2011-0043992

(51) Int. Cl.
*H01M 8/10* (2006.01)
*H01M 4/88* (2006.01)
(Continued)

(52) U.S. Cl.
CPC .......... *H01M 8/1004* (2013.01); *B32B 37/025* (2013.01); *H01M 4/881* (2013.01);
(Continued)

(58) Field of Classification Search
CPC . H01M 8/1004; H01M 4/8996; H01M 4/881; H01M 4/8882; H01M 4/8814; H01M 2008/1095; B23B 37/025; B23B 2309/04; B23B 2309/02; B23B 2309/12; B23B 2038/168; B23B 2037/243; B23B 2457/18; Y02E 60/50; Y02E 60/522
See application file for complete search history.

(56) References Cited

U.S. PATENT DOCUMENTS 3,385,736 A * 5/1968 Deibert ............................. 502/4
2003/0082429 A1* 5/2003 Nishimura et al. ............. 429/35
(Continued)

FOREIGN PATENT DOCUMENTS

JP    H10-064574      *  8/1996   ............. H01M 4/86
JP    10-064574 A        3/1998
(Continued)

OTHER PUBLICATIONS

ScinceLab MSDS—Terpineol Oct. 10, 2005 updated May 21, 2013 {http://www.sciencelab.com/msds.php?msdsId=9925180}.*
(Continued)

*Primary Examiner* — Patrick Ryan
*Assistant Examiner* — Aaron Greso
(74) *Attorney, Agent, or Firm* — D. Peter Hochberg; Sean F. Mellino

(57) ABSTRACT

The present invention provides a method for manufacturing a membrane-electrode assembly for a polymer electrolyte fuel cell, in which the glass transition temperature of an electrolyte membrane is reduced using a hydrophilic solvent, and a membrane-electrode assembly for a polymer electrolyte fuel cell, manufactured by the method. In the method of the invention, the glass transition temperature of the electrolyte membrane to which a catalyst is transferred is reduced compared to that in a conventional method for manufacturing a membrane-electrode assembly for a polymer electrolyte fuel cell using the decal process. Thus, even to an electrolyte membrane material having a relatively high glass transition temperature, the catalyst may be transferred at a rate of 100% at a temperature of about 120° C., at which hot pressing is carried out. Thus, the problems associated with electrolyte membrane deterioration occurring in conventional methods can be solved.

8 Claims, 3 Drawing Sheets

(51) Int. Cl.
  *B32B 37/00* (2006.01)
  *B32B 37/24* (2006.01)
  *B32B 38/16* (2006.01)

(52) U.S. Cl.
  CPC .......... *H01M 4/8814* (2013.01); *H01M 4/8882* (2013.01); *H01M 4/8896* (2013.01); *B32B 2037/243* (2013.01); *B32B 2038/168* (2013.01); *B32B 2309/02* (2013.01); *B32B 2309/04* (2013.01); *B32B 2309/12* (2013.01); *B32B 2457/18* (2013.01); *H01M 2008/1095* (2013.01); *Y02E 60/50* (2013.01); *Y02E 60/522* (2013.01)

(56) References Cited

U.S. PATENT DOCUMENTS

| | | | |
|---|---|---|---|
| 2004/0242708 A1* | 12/2004 | Hasegawa et al. | 521/27 |
| 2007/0212593 A1* | 9/2007 | Raiford et al. | 429/44 |
| 2010/0112891 A1* | 5/2010 | Ishino et al. | 445/58 |

FOREIGN PATENT DOCUMENTS

| | | | | |
|---|---|---|---|---|
| JP | 2002-093424 A | 3/2002 | | |
| JP | 2009-140652 A | 6/2009 | | |
| JP | 2010-033910 A | 2/2010 | | |
| KR | 2004-0104839 A | 12/2004 | | |
| KR | 2009-0132420 A | 12/2009 | | |
| KR | 2010-0038543 A | 4/2010 | | |
| WO | WO 2009/113292 | * | 9/2009 | H01J 9/92 |

OTHER PUBLICATIONS

International Search Report dated Oct. 30, 2012; PCT/KR2012/002305 (WO2012/153915).
Written Opinion of the ISA dated Oct. 30, 2012; PCT/KR2012/002305 (WO2012/153915).
Krishnan, et al.; International Journal of Hydrogen Energy 35 (2010); pp. 5647-5655.

* cited by examiner

METHOD FOR MANUFACTURING MEMBRANE-ELECTRODE ASSEMBLY FOR POLYMER ELECTROLYTE FUEL CELL AND MEMBRANE-ELECTRODE ASSEMBLY MANUFACTURED THEREBY

TECHNICAL FIELD

The present invention relates to a method for manufacturing a membrane-electrode assembly for a polymer electrolyte fuel cell and a membrane-electrode assembly manufactured thereby, and more particularly to a method for manufacturing a membrane-electrode assembly for a polymer electrolyte fuel cell, in which the glass transition temperature of an electrolyte membrane to which a catalyst is transferred is reduced compared to that of an electrolyte membrane of a conventional decal process for manufacturing a membrane-electrode assembly for a polymer electrolyte fuel cell, so that the catalyst can be transferred at a hot-pressing temperature lower than that in the conventional method, and to a membrane-electrode assembly manufactured thereby.

BACKGROUND ART

Conventional membrane-electrode assemblies for fuel cells are largely classified into two categories: a catalyst-coated membrane (CCM), and a catalyst-coated substrate (CCS). In the CCM among these membrane-electrode assemblies, a catalyst later is applied directly to an electrolyte membrane, and the interfacial properties between the catalyst layer and the electrolyte membrane are excellent. However, there is a disadvantage in that it is not easy to uniformly form the catalyst layer on the membrane surface, because the membrane is deformed by a solvent contained in a catalyst slurry for forming the catalyst layer when the catalyst slurry is applied to the membrane. The most typical method capable of solving this problem is a decal process. The decal process has received attention, because the interfacial properties between a gas diffusion layer, a catalyst layer and a membrane are excellent and the catalyst layer can be formed by a continuous process, and thus mass production is possible.

With respect to the decal process, Korean Patent Laid-Open Publication No. 2004-0104839 discloses a method for manufacturing a fuel cell electrode, comprising the steps of: mixing catalyst particles, a hydrogen ion conductive polymer and a solvent system capable of dispersing or dissolving the hydrogen ion conductive polymer, thereby preparing a catalyst slurry containing the catalyst particles dispersed uniformly therein; applying the catalyst slurry to a polymer substrate and drying the applied catalyst slurry, thereby forming a catalyst layer on the polymer substrate; and placing the polymer substrate on a diffusion layer in such a manner that the catalyst comes into contact with the diffusion layer, and then applying heat and pressure to the resulting structure to transfer the catalyst layer to the diffusion layer, thereby manufacturing the electrode.

And, Korean Patent Laid-Open Publication No. 2009-0132420 discloses a method in which a hot-pressing process is carried out twice in different directions in order to increase the transfer rate of the catalyst layer, and a method in which a release agent is used. This patent publication describes a transfer rate of 100%, which is higher than those of previous patents. In addition, Korean Patent Laid-Open Publication No. 2010-0038543 discloses the results of many studies associated with the decal process, including the composition of solvents for a catalyst slurry, a method of dispersing a catalyst, and conditions for coating and drying the catalyst.

These studies have been conducted on a Nafion® polymer electrolyte membrane (DuPont) having a relatively low glass transition temperature, and for this reason, include a hot-pressing temperature of about 120° C., which is relatively low. But, Nafion® is expensive, so, more inexpensive hydrocarbon-based membranes are currently being developed. But, hydrocarbon-based polymers for preparing these hydrocarbon-based membranes have a glass transition temperature of 200° C. or higher, and thus the hot-pressing process for transfer requires high temperatures that reduce the actual utility of the decal process. In addition, due to a desulfonation occurring at a temperature of 200° C. or higher, the sulfonyl substituent such as sulfonic acid of the hydrocarbon-based membranes should be changed to highly heat-resistant sodium salt before hot pressing, and the sodium salt should be changed again to hydrogen ions after the manufacture of the membrane-electrode assembly. Further, in the substitution process, the hydrocarbon-based membrane comes into contact with a large amount of an aqueous solution, resulting in the deformation of the shape of the membrane-electrode assembly. This is contrary to the advantage of the decal process that prevents the deformation of the shape of membrane-electrode assemblies.

Thus, an advanced and specific decal process for polymers having high glass transition temperatures has been studied. For example, non-patent document 1 (Krishnan et al., International Journal of Hydrogen Energy 35 (2010) 5647-5655) disclosed a decal process showing a transfer rate of 100% under the conditions of 140° C., 8 MPa and 8 min as a result of sequentially depositing a carbon layer, a catalyst layer and an external Nafion® layer on a Teflon polymer substrate and hot-pressing the resulting structure to a hydrocarbon-based membrane. However, the product obtained that process has a structure in which the Nafion® membrane is interposed between the catalyst layer and the hydrocarbon-based membrane, which is similar to the structure obtained by the conventional decal process for Nafion® polymers. Thus, a more advanced and specific decal process that may be applied to polymers having high glass transition temperatures is required.

Accordingly, the present inventors have found that polymers having high glass transition temperatures can be transferred at low temperatures, when the glass transition temperature of a hydrocarbon-based electrolyte membrane is reduced by applying a hydrophilic solvent to a hydrocarbon-based electrolyte membrane in a hot-pressing process required for the decal process, thereby completing the present invention.

DISCLOSURE

Technical Problem

It is an object of the present invention to provide a method for manufacturing a membrane-electrode assembly for a polymer electrolyte fuel cell, which enables a catalyst to be transferred at a hot-pressing temperature lower than that in conventional methods.

Another object of the present invention is to provide a membrane-electrode assembly for a polymer electrolyte fuel cell, manufactured by the above method.

Technical Solution

In order to accomplish the above objects, the present invention provides a method for manufacturing a membrane-electrode assembly for a polymer electrolyte fuel cell, the method comprising the steps of: (1) applying to a release film a catalyst slurry composed of a mixture of a catalyst, a hydrogen ion conductive polymer and a dispersion medium, and drying the applied slurry, thereby forming a catalyst layer; (2) laminating the catalyst formed on the release film on both sides of an electrolyte membrane having a hydrophilic solvent applied thereto in such a manner that the catalyst layer faces the electrolyte membrane; and (3) hot-pressing the laminate to transfer the catalyst layer to the electrolyte membrane.

The electrolyte membrane is preferably a hydrocarbon-based polymer membrane, which has one or more cation exchange groups selected from the group consisting of a sulfonate group, a carboxyl group, a phosphate group, an imide group, a sulfonimide group, a sulfonamide group and a hydroxyl group, is hydrophilic in nature, and has a glass transition temperature of 150° C. or higher.

The hydrophilic solvent is preferably one or more selected from the group consisting of alcohol, ketone, aldehyde, carbonate, carboxylate, carboxylic acid, ether and amide.

The hydrophilic solvent preferably has a boiling point of 80~250° C. at 1 atm.

The hydrophilic solvent is preferably applied in an amount of 100-1000 mg(solvent)/cm$^3$(electrolyte membrane).

The hot-pressing is preferably carried out at a temperature of 40~200° C. and a pressure of 10-50 kgf/cm$^2$.

The temperature of the hot pressing is preferably lower than the boiling point of the hydrophilic solvent by 10° C. or more.

The inventive method for manufacturing the membrane-electrode assembly for the polymer electrolyte fuel cell may further comprise, after step (3), step (4) of removing the release film from the hot-pressed stack and removing the hydrophilic solvent.

The removal of the hydrophilic solvent is preferably carried out at a temperature of 100° C. or lower and a pressure of $10^{-1}$ torr or lower.

Advantageous Effects

According to the present invention as described above, the catalyst can be completely (100%) transferred through the decal process at a hot-pressing temperature of about 120° C., which is lower than that in conventional methods, by lowering the glass transition temperature of the hydrocarbon-based membrane during the manufacture of the hydrocarbon-based membrane-electrode assembly. Thus, the problem caused by deterioration of the electrolyte membrane in the conventional methods can be solved.

BEST MODE

Figure 1:
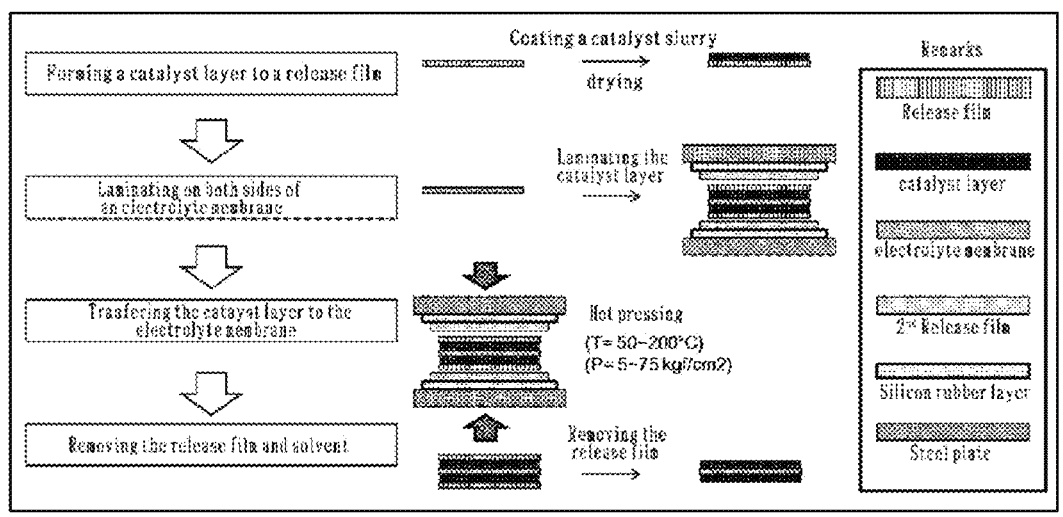
FIG. 1 is a schematic view showing the inventive method for manufacturing a membrane-electrode assembly for a polymer electrode fuel assembly.

Hereinafter, the present invention will be described in detail with reference to the accompanying drawings. FIG. 1 is a schematic view showing the inventive method for manufacturing a membrane-electrode assembly for a polymer electrode fuel assembly. As shown in FIG. 1, the inventive method for manufacturing a membrane-electrode assembly for a polymer electrode fuel assembly comprises the steps of: (S1) applying to a release film a catalyst slurry composed of a mixture of a catalyst, a hydrogen ion conductive polymer and a dispersion medium, and drying the applied slurry, thereby forming a catalyst layer; (S2) laminating the catalyst layer formed on the release film on both sides of an electrolyte membrane having a hydrophilic solvent applied thereto in such a manner that the catalyst layer faces the electrolyte membrane; and (S3) hot-pressing the laminate to transfer the catalyst layer to the electrolyte membrane.

Step (S1) is a step of applying to a release film a catalyst slurry composed of a mixture of a catalyst, a hydrogen ion conductive polymer and a dispersion medium, and drying the applied slurry, thereby forming a catalyst layer. In an example of the present invention, a catalyst slurry obtained by dispersing 20-60 wt % of a carbon-supported platinum catalyst (Pt/C) in a mixture of isopropyl alcohol and water was used. However, a catalyst that may be used in the present invention is not limited to the carbon-supported platinum catalyst, and thus may be one or more selected from the group consisting of a platinum (Pt) catalyst, a carbon-supported platinum catalyst (Pt/C), a platinum-ruthenium alloy catalyst (Pt—Rh), and a carbon-supported platinum-ruthenium alloy catalyst (Pt—Rh/C). Of these catalysts, the carbon-supported catalyst is composed of the catalyst supported on the surface of very fine carbon powder such as carbon black, Ketjen black, acetylene black, activated carbon powder, carbon nanotubes, carbon nanohorns, or a mixture of two or more thereof. The carbon-supported catalyst is preferable because it has an increased specific surface area leading to increased reaction efficiency.

The hydrogen ion conductive polymer that is used in the catalyst slurry functions to form an ion transfer network that facilitates the migration of hydrogen ions between catalyst particles. It also functions as a binder that enables the catalyst layer to retain suitable mechanical strength. Polymers, which are suitable for this purpose and have a cation exchange group, include a Nafion® polymer solution (Nafion®, DE521 perfluorinated ion-exchange polymer solution) commercially available from DuPont (USA), which is used in an example of the present invention.

Meanwhile, as the dispersion medium that is used in the catalyst slurry of the present invention, a mixture of isopropyl alcohol and water is used in an example of the present invention, but is not limited thereto, and any dispersion medium capable of dispersing or dissolving the catalyst and the hydrogen ion conductive polymer may be used without limitation in the present invention. Preferably, the dispersion medium that is used in the present invention is one or more organic solvents selected from the group consisting of an alcohol-based solvent having 1 to 9 carbon atoms, an aliphatic ester-based solvent having 1 to 9 carbon atoms, an aliphatic amide-based solvent having 1 to 9 carbon atoms, and an alicyclic amide-based solvent having 1 to 9 carbon atoms. The dispersion medium may also be a mixture of one or more of the organic solvents with water.

The content of the catalyst in the catalyst slurry is preferably 2-30 wt % based on the total weight of the catalyst slurry. The same kinds of catalyst manufactured by different companies can show different viscosities, even when they are used in the same amount. If the catalyst is used in an amount of less than 2 wt % based on the total weight of the catalyst slurry in the manufacture of the catalyst slurry, the catalyst can be easily dispersed, but it will be difficult to reach a desired catalyst amount, and thus the application process will be repeated several times, making it difficult to calculate a uniform catalyst amount, and a catalyst layer having a non-uniform thickness will be fondled, resulting in deterioration in the performance of the membrane-electrode assembly. On the other hand, if the content of the catalyst in the catalyst slurry is more than 20 wt %, uniform dispersion of the catalyst will be very difficult, and the time required for dispersion will become excessively longer, resulting in deterioration in the performance of the membrane-electrode assembly. Meanwhile, the viscosity of the prepared catalyst slurry is preferably maintained between 20 cps and 2000 cps. If the viscosity of the catalyst slurry is less than 20 cps, the catalyst slurry will have high flowability when forming the catalyst layer on the release film, making it difficult to form a uniform catalyst layer and to apply more than a proper amount of the catalyst. On the other hand, if the viscosity of the catalyst slurry is more than 2000 cps, the flowability of the catalyst particles will decrease, making it difficult to form a uniform catalyst layer.

The mixed catalyst slurry is preferably subjected 2-3 times to an ultrasonic dispersion process for 10-30 minutes and a mechanical stirring process for 2-20 hours in order to facilitate the dispersion of the catalyst.

The catalyst slurry obtained as described above is coated on the release film to a thickness of 50-200 μm using a coating technique such as doctor blade coating, comma coating, knife coating or bar coating in a state in which it contains the dispersion medium. Examples of the release film that is used in the present invention include a polyester film such as a polyethylene terephthalate film or a polyethylene naphthalate film, a polyimide film, a polyamide film such as a nylon 6 film or a nylon 66 film, a polyolefin film such as a polyethylene film or a polypropylene film, a chlorine- and/or fluorine-substituted polyolefinic polymer film, and a vinyl-based polymer film such as a polystyrene film. Among them, the polyimide-based or Teflon-based film is preferably used because it has low adhesion to the catalyst adhesion.

The drying temperature of the coated catalyst slurry greatly influences the structure of the catalyst layer. When Nafion® is used as the hydrogen ion conductive polymer as described in an example of the present invention, the drying temperature of the coated catalyst slurry is preferably in the range of 100 to 140 ▢ . If the drying temperature is lower than 100° C., which is lower than the glass transition temperature of the Nafion® binder, the bonds between Nafion® polymer molecules by rearrangement will not be formed, and thus smooth formation of electron transfer channels by the Nafion® binder will not be achieved. If the drying temperature is higher lower than 140° C., the linkage between the sulfone group and the polymer will be broken, and thus the Nafion® polymer cannot act as electron transfer channels. In the case of a catalyst slurry for a direct methanol fuel cell, a primary drying process at 60° C. or lower may also be required.

Step (S2) of the inventive method for manufacturing the membrane-electrode assembly for polymer electrolyte fuel cells is a step of laminating the catalyst layer formed on the release film on both sides of an electrolyte membrane having a hydrophilic solvent applied thereto. Herein, the lamination is carried out in such a manner that the catalyst layer faces the electrolyte membrane.

The electrolyte membrane to which the catalyst slurry is applied refers to a membrane formed of a polymer having a cation exchange group capable of transferring hydrogen ions. In fuel cells, the electrolyte membrane is interposed between an anode and a cathode, and the typical function thereof is transfer hydrogen ions, produced in the ionization of hydrogen particles in the anode, to the cathode through a highly hydrophilic material such as a sulfonate group, while blocking the transfer of fuel from the anode to the cathode. Specifically, the electrolyte membrane is preferably a hydrocarbon-based polymer membrane having one or more cation exchange groups selected from the group consisting of a sulfonate group, a carboxyl group, a phosphate group, an imide group, a sulfonimide group, a sulfonamide group and a hydroxyl group.

Examples of the polymer that is used for the hydrocarbon-based polymer electrolyte include homopolymers and copolymers of styrene, imide, sulfone, phosphazene, etherether ketone, ethylene oxide, polyphenylene sulfide, or aromatic group. These polymers may be used alone or in combination. When the electrolyte membrane is prepared using the hydrocarbon-based ion conductive polymer, it is easily prepared at low costs compared to when a fluorine-based polymer is used. In addition, the hydrocarbon-based ion conductive polymer shows higher ion conductivity than a fluorine-based polymer.

The hydrocarbon-based polymer electrolyte membrane is particularly preferably made of one or more selected from the group consisting of sulfonated polysulfone, sulfonated polyethersulfone, sulfonated poly(ether ketone), sulfonated poly (ether ether ketone), sulfonated poly(arylene ether ether ketone), sulfonated poly(arylene ether sulfone), sulfonated poly(arylene ether benzimidazole), and an ion conductive polymer partially introduced with fluorine.

Because the hydrocarbon-based electrolyte membrane as described has a glass transition temperature higher than that of Nafion® that is a fluorine-based electrolyte membrane, the electrode layer was transferred to the electrolyte membrane, only when the hot-pressing process was carried out at a temperature of 200° C. or higher. However, in the present invention, the hydrophilic solvent is applied to the hydrocarbon-based membrane before the hot-pressing step of the decal process in order to lower the glass transition temperature of the electrolyte membrane, thereby providing a hydrocarbon-based decal process that shows a transfer rate of 100% at a temperature of 120° C. or lower. The conventional decal process employing the Nafion® polymer showed a high transfer rate at similar temperatures, but the decal process that uses the hydrocarbon-based polymer showed a low transfer rate even at 200° C. or higher.

Selection of the hydrophilic solvent is very important to achieve a transfer rate of 100% and lower the glass transition temperature of the electrolyte membrane. Herein, the hydrophilic solvent is preferably a highly hydrophilic solvent having one or more functional groups selected from the group consisting of alcohol, ketone, aldehyde, carbonate, carboxylate, carboxylic acid, ether and amide.

The hydrophilic solvent preferably has a boiling point of 80~250° C. at 1 atm. If the hydrophilic solvent has a boiling point of 80° C. or lower, it will be strongly volatile, making it difficult to control the amount thereof, and a portion of the solvent will be volatilized before the transfer of the catalyst layer in the hot-pressing step is completed, resulting in a decrease in the transfer rate. On the other hand, if the hydrophilic solvent has a boiling point of 250° C. or higher, the catalyst layer will be easily transferred because of the low volatility of the solvent, but it will be difficult to remove the solvent in a subsequent process.

The hydrophilic solvent contains a $C_{3-12}$ straight-chain or branched, saturated or unsaturated hydrocarbon as a main chain, and examples thereof include alcohol, ketone, aldehyde, carbonate, carboxylate, carboxylic acid, ether and amide compounds, which may contain an alicyclic or aromatic cyclic compound as at least a portion of the main chain. Specifically, examples of the alcohol include 1,2-propanediol, 1-pentanol, 1,5-pentanediol, and 1,9-nonanediol; examples of the ketone include heptanone and octanone; examples of the aldehyde include benzaldehyde and tualdehyde; examples of the ester include methyl pentanoate, and ethyl 2-hydroxypropanoate; example of the carboxylic acid include pentanoic acid, and heptanoic acid; examples of the ether include methoxy benzene, and dimethoxy propane; and examples of the amide include propanamide, butyramide and the like.

The hydrophilic solvent is applied to the electrolyte membrane using a brush, spray, doctor blade or comma coater or the like. When the hydrophilic solvent is applied using this coater, the electrolyte membrane is preferably located on a vacuum plate in order to help the absorption of the solvent into the electrolyte membrane during the application of the solvent. The penetration of the solvent into the electrolyte membrane is important to lower the glass transition temperature of the electrolyte membrane. In addition, it is preferable to apply the solvent alternately to both sides of the electrolyte membrane in order to uniformly distribute the solvent. The solvent is preferably applied in an amount of 100-1000 mg(solvent)/cm³(electrolyte membrane). If the solvent is applied in an amount of less than 100 mg/cm³, it will not be uniformly distributed on the electrolyte membrane, and if the solvent is applied in an amount of more than 1000 mg/cm³, the solvent will be condensed in the hot-pressing step so that the catalyst layer will agglomerate, and thus a non-uniform catalyst layer can be formed, and it will not be easy to remove the solvent in a subsequent process.

Meanwhile, the catalyst layer formed on the release film in step (S1) is laminated on both sides of the electrolyte membrane having the hydrophilic solvent applied thereto in such a manner that the catalyst layer faces the electrolyte membrane. Before the lamination, the release film having the catalyst layer formed thereon and/or the electrolyte membrane may be cut to a size suitable for the process, specifically a size of 5-50 cm².

After lamination of the release film having the catalyst film applied thereto, a second release film may additionally be laminated to cover the electrolyte membrane. Herein, the second release film preferably has a glass transition temperature that is at least 20° C. higher than the hot-pressing temperature, and a film corresponding to the release film that is used in step (S1) satisfies this condition. Thus, a film made of the same material as that of the release film that is used in step (S1) is preferably used as the second film. The second release film functions to protect the electrolyte membrane. More particularly, it functions to prevent the electrolyte membrane from adhering to a stainless steel plate in the hot-pressing step.

Meanwhile, on the second release film, a silicone rubber layer may be laminated which is not deformed at the hot-pressing temperature. The silicone rubber layer has the following two functions. First, it functions to suppress the volatilization of the hydrophilic solvent from the polymer electrolyte membrane containing the hydrophilic solvent. Second, it functions to enable uniform pressure to be applied to the surface of a stainless steel plate in the hot-pressing step. The silicone rubber layer is preferably formed of polysiloxane rubber which has excellent flexibility and heat resistance compared to other polymers. Typical examples of the polysiloxane rubber include silicone rubber products commercially available from ERIKS (USA) and Dupont (USA). The thickness of the silicone rubber layer is preferably 1-5 mm, and more preferably 2 mm.

In step (S3) of the method for manufacturing the membrane-electrode assembly for polymer electrolyte fuel cells, the laminate resulting from step (S2) is hot-pressed so that the catalyst layer is transferred to the electrolyte membrane.

The transfer of the catalyst layer by hot-pressing is preferably carried out at a temperature of 40~200° C. and a pressure of 5-75 kgf/cm². If the transfer temperature is lower than 40° C., the catalyst layer will not be transferred at a transfer rate of 100%, and if it is higher than 200° C., the sulfone group of the catalyst layer binder will be separated from the polymer, and thus will lose its function. Moreover, if the transfer pressure is lower than 5 kgf/cm², the catalyst layer will not be easily transferred, and if it is higher than 75 kgf/cm², the catalyst layer will be excessively pressed, and thus the catalyst layer will not be precisely transferred. In addition, in this case, difficulty in formation of pores in the catalyst will occur to interfere with smooth transfer of fuel, resulting in deterioration in the performance of the fuel cell.

Additionally, the hot-pressing temperature is preferably lower than the boiling temperature of the hydrophilic solvent by 10° C. or more. If the hot-pressing temperature is higher than 10° C. below the boiling temperature of the hydrophilic solvent, the solvent contained in the membrane will boil due to instantaneous overheating, resulting in swelling of the membrane itself. In addition, in this case, the hydrophilic solvent will volatilize in an amount larger than required, making it not easy to transfer the catalyst layer.

Meanwhile, the inventive method for manufacturing the membrane-electrode assembly for polymer electrolyte fuel cells may further comprise, after step (S3), step (S4) of removing the release film from the hot-pressed laminate and removing the hydrophilic solvent. Herein, the removal of the hydrophilic solvent is preferably carried out at a temperature of 100° C. or lower and a pressure of $10^{-1}$ torr or lower.

Hereinafter, the present invention will be described in further detail with reference to examples. It is to be understood, however, that these examples are for illustrative purposes only and are not intended to limit the scope of the present invention.

Example 1

First, 170 mg of a 40 wt % Pt/C catalyst commercially available from E-tek (USA), 600 mg of a 5 wt % Nafion® dispersion (DuPont Inc., USA), 870 mg of water and 460 mg of isopropyl alcohol were prepared and stirred ultrasonically for 30 minutes so that the catalyst was uniformly mixed with the Nafion®, thereby obtaining a catalyst slurry. The catalyst slurry obtained as described above was coated on a polyimide film using a doctor blade. After coating, the thickness of the catalyst layer was adjusted to 200 μm in a wet state. The catalyst slurry was dried in an oven in a nitrogen atmosphere at 120° C. for 10 hours.

Next, the catalyst layer coated on the polyimide film was cut to a size of 5 cm², and then laminated on a sulfonated poly(arylene ether sulfone) (degree of sulfonation=50 or less; hereinafter referred to as "SPAES50"] film (60 μm thickness). The SPAES50 film had a solution of 1,2-propanediol (boiling point: 188° C.) applied thereto by a brushing method before lamination of the catalyst layer. Herein, the 1,2-propanediol solution that is a hydrophilic solvent was applied in an amount of 200 mg/cm³ of the electrolyte membrane. The catalyst layer coated on the polyimide film was placed on both sides of the 1,2-propanediol-containing SPAES50 film in such a manner that the catalyst layer faced the SPAES50 film, and then a polyimide film was additionally attached thereto to protect the polymer electrolyte membrane.

Finally, the resulting laminate was interposed between silicone rubber members and interposed between stainless steel plates, after it was pressed using a flat press (Carver Inc., USA) at 120° C. for 3 minutes under a pressure of 20 kgf/cm², thereby manufacturing a membrane-electrode assembly.

The polyimide film was removed from the manufactured membrane-electrode assembly, and the transfer rate of the catalyst layer was measured based on the weight of the catalyst layer remaining on the film. The transfer rate was measured to be 100%.

Example 2

A membrane-electrode assembly was manufactured and the transfer rate was measured in the same manner as described in Example 1, except that the solution applied to the SPAES50 hydrocarbon-based electrolyte membrane was 1-pentanol (boiling point: 138° C.). The transfer rate was measure to be 100%.

Comparative Example 1

First, 170 mg of a 40 wt % Pt/C catalyst commercially available from E-tek (USA), 600 mg of a 5 wt % Nafion® dispersion (DuPont Inc., USA), 870 mg of water and 460 mg of isopropyl alcohol were prepared and stirred ultrasonically for 30 minutes so that the catalyst was uniformly mixed with the Nafion®, thereby obtaining a catalyst slurry. The catalyst slurry obtained as described above was coated on a polyimide film using a doctor blade. After coating, the thickness of the catalyst layer was adjusted to 200 μm in a wet state. The catalyst slurry was dried in an oven in a nitrogen atmosphere at 120° C. for 10 hours.

Next, the catalyst layer coated on the polyimide film was cut to a size of 5 cm², and then laminated on an SPAES50 film (60 μm thickness). The SPAES50 film had decane applied thereto by a brushing method before lamination of the catalyst layer. Herein, the decane as a solution was applied in an amount of 200 mg/cm³ of the electrolyte membrane. The catalyst layer coated on the polyimide film was placed on both sides of the decane-containing SPAES50 film in such a manner that the catalyst layer faced the SPAES50 film, and then a polyimide film was additionally attached thereto to protect the polymer electrolyte membrane.

Finally, the resulting laminate was interposed between silicone rubber members and interposed between stainless steel plates, after it was pressed using a flat press (Carver Inc., USA) at 120° C. for 3 minutes under a pressure of 20 kgf/cm², thereby manufacturing a membrane-electrode assembly.

The polyimide film was removed from the manufactured membrane-electrode assembly, and the transfer rate of the catalyst layer was measured based on the weight of the catalyst layer remaining on the film. The transfer rate was measured to be 10%.

Comparative Example 2

A membrane-electrode assembly was manufactured in the same manner as described in Example 1, except that the second solvent was not applied to the hydrocarbon-based electrolyte membrane SPAES-50. The measured transfer rate of the membrane-electrode assembly was 0%.

Comparative Example 3

A membrane-electrode assembly was manufactured using a conventional decal process at high temperature.

First, 600 mg of a polymer Nafion® dispersion (DuPont Inc., USA) was mixed with an aqueous solution of NaOH. Herein, the molar ratio of the sulfone group of Nafion® to NaOH was 1:30. 170 mg of a 40 wt % Pt/C catalyst commercially available from E-tek (USA), 870 mg of water, 460 mg of isopropyl alcohol and the above-prepared Nafion® solution were stirred ultrasonically for 30 minutes so that the catalyst was uniformly mixed with the Nafion®, thereby obtaining a catalyst slurry. The catalyst slurry obtained as described above was coated on a polyimide film using a doctor blade. After coating, the thickness of the catalyst layer was adjusted to 200 μm in a wet state. The catalyst slurry was dried in an oven in a nitrogen atmosphere at 120° C. for 10 hours.

Next, the catalyst layer coated on the polyimide film was cut to a size of 5 cm², and then laminated on an SPAES50 film (60 μm thickness). The catalyst layer coated on the polyimide film was placed on both sides of the SPAES50 film in such a manner that the catalyst layer faced the SPAES50 film, and then a polyimide film was additionally attached thereto to protect the polymer electrolyte membrane.

Finally, the resulting laminate was interposed between silicone rubber members and interposed between stainless steel plates, after it was pressed using a flat press (Carver Inc., USA) at 240° C. for 3 minutes under a pressure of 20 kgf/cm², thereby manufacturing a membrane-electrode assembly.

The polyimide film was removed from the manufactured membrane-electrode assembly, and the transfer rate of the catalyst layer was measured based on the weight of the catalyst layer remaining on the film. The transfer rate was measured to be 100%.

Figure 2A:
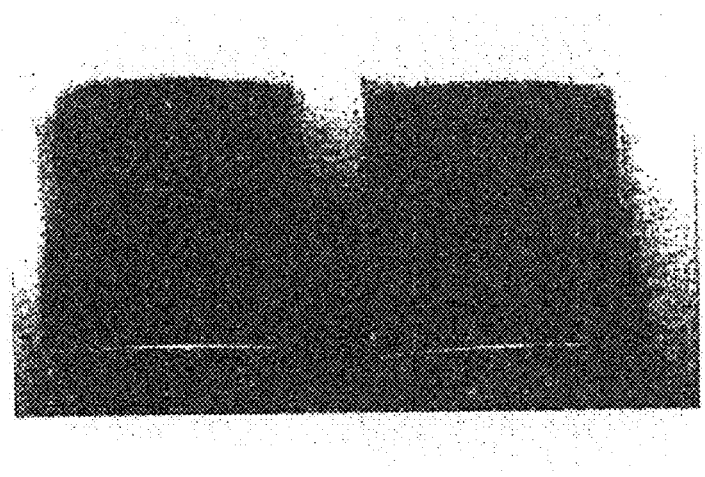
FIG. 2a is a photograph of a release film separated after transferring a catalyst layer during the manufacture of a membrane-electrode assembly in Example 2.
Figure 2B:
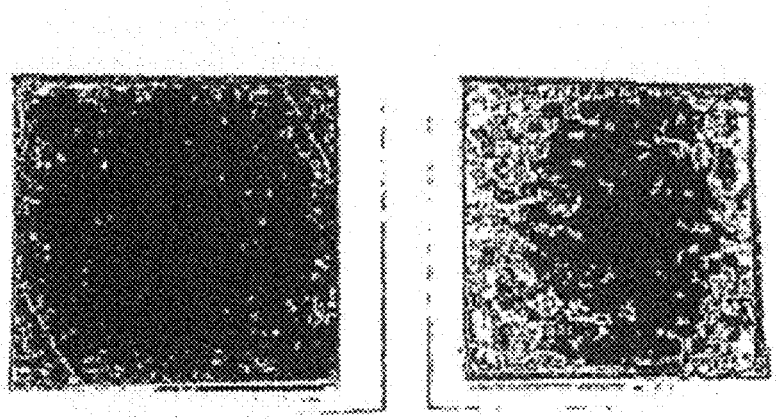
FIG. 2b is a photograph of a release film separated from a membrane-electrode assembly manufactured in Comparative Example 1.

FIG. 2a is a photograph of the release film separated after transferring a catalyst layer during the manufacture of the membrane-electrode assembly in Example 2, and FIG. 2b is a photograph of the release film separated from the membrane-electrode assembly manufactured in Comparative Example 1. In FIGS. 2a and 2b, the yellow color indicates the polyimide film that is the release film, and the block color indicates the catalyst layer laminated on the release film. As can be seen in FIG. 2a, the catalyst layer formed on the release film in Example 2 was completely transferred to the electrolyte membrane. However, as can be seen in FIG. 2b, the catalyst layer formed on the release film in Comparative Example 1 was not substantially transferred even after hot pressing (transfer rate: <10 wt %).

Figure 3:
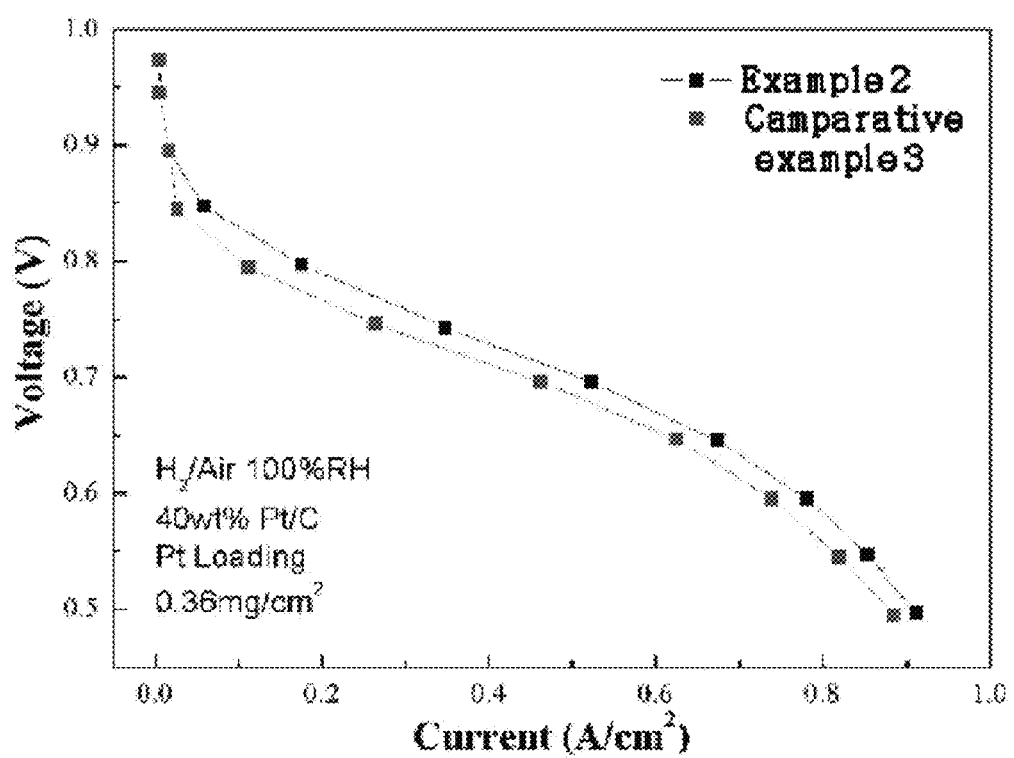
FIG. 3 is a current-voltage curve showing the results of comparatively evaluating the performance of fuel cells including the membrane-electrode assemblies manufactured in Example 2 and Comparative Example 3.

FIG. 3 is a current-voltage curve showing the results of comparatively evaluating the performance of fuel cells including the membrane-electrode assemblies manufactured in Example 2 and Comparative Example 3. The data in FIG. 3 were measured using a FCT-TS300 fuel cell testing station (Fuel Cell Technologies Inc., USA). Activation of the fuel cells was performed at 0.6 V and a RH of 100% for 48 hours. The current-voltage curve (I-V graph) was measured in the voltage range from 0.5V to 1.0V with a step of 50 mV for 25 seconds each time. The X-axis in the graph of FIG. 3 indicates current density, and the Y-axis indicates voltage. The graph of FIG. 3 shows the change in current density as a function of a change in voltage and is a typical method used to evaluate the performance of fuel cells. As can be seen in the graph of FIG. 3, the fuel cell of Example 2 showed higher current densities than that of Comparative Example 3 at all voltages. Even though the fuel cells of the two Examples were measured using the same membrane and catalyst layer, the fuel cell including the catalyst layer prepared according to the method of the present invention showed better performance. This suggests that the performance of the fuel cell including the membrane-electrode assembly of Comparative Example 3 was deteriorated due to damage caused by the deterioration of Nafion®, but the fuel cell including the membrane-electrode assembly of Example 2 showed excellent performance as a result of low-temperature treatment.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, according to the present invention, problems of the prior arts associated with the electrolyte membrane deterioration caused by the high-temperature decal process are solved by the use of the low-temperature decal process. The membrane-electrode assembly manufactured according to the present invention shows performance comparable to that of the membrane-electrode assembly manufactured by the conventional high-temperature decal process. The method of the present invention can be applied to membrane-electrode assemblies for polymer electrolyte fuel cells and direct methanol fuel cells.

The invention claimed is:

1. A manufacturing method for producing a membrane-electrode assembly for a polymer electrolyte fuel cell, the method comprising the steps of:
    (1) applying a catalyst slurry to a release film, said catalyst slurry composed of a mixture of a catalyst, a hydrogen ion conductive polymer and a dispersion medium, and drying the applied catalyst slurry, thereby forming a catalyst layer;
    (2) laminating the catalyst formed on the release film on both sides of an electrolyte membrane in such a manner that the catalyst layer faces the electrolyte membrane, wherein the electrolyte membrane is a polymer film made by a hydrocarbon polymer selected from the group consisting of sulfonated polysulfone, sulfonated polyethersulfone, sulfonated poly ether ketone, sulfonated poly ether ether ketone, sulfonated poly arylene ether ether ketone, sulfonated poly arylene ether sulfone, sulfonated poly arylene ether benzimidazole and partially fluorinated ion conductor, and
    wherein the electrolyte membrane is coated by hydrophilic solvent with an amount of 100-1000 mg of solvent per $cm^3$ of the electrolyte membrane; and
    (3) hot-pressing the laminate to transfer the catalyst layer to the electrolyte membrane.

2. The method of claim 1, wherein the electrolyte membrane is a hydrocarbon-based polymer membrane, which contains one or more cation exchange groups selected from the group consisting of a sulfonate group, a carboxyl group, a phosphate group, an imide group, a sulfonimide group, a sulfonamide group and a hydroxyl group, is hydrophilic in nature, and has a glass transition temperature of 150° C. or higher.

3. The method of claim 1, wherein the hydrophilic solvent is one or more selected from the group consisting of alcohol, ketone, aldehyde, carbonate, carboxylate, carboxylic acid, ether and amide.

4. The method of claim 3, wherein the hydrophilic solvent has a boiling point of 80~250° C. at 1 atm.

5. The method of claim 1, wherein the hot-pressing is carried out at a temperature of 40~200° C. and a pressure of 10-50 $kg_f/cm^2$.

6. The method of claim 1, wherein the temperature of the hot pressing is lower than the boiling point of the hydrophilic solvent by 10° C. or more.

7. The method of claim 1, further comprising, after step (3), step (4) of removing the release film from the hot-pressed stack and removing the hydrophilic solvent.

8. The method of claim 5, wherein the removal of the hydrophilic solvent is carried out at a temperature of 100° C. or lower and a pressure of $10^{-1}$ torr or lower.

* * * * *